United States Patent [19]

Klein

[11] Patent Number: 4,708,401

[45] Date of Patent: Nov. 24, 1987

[54] BRAKE SYSTEM FOR THE CONTROL OF BRAKE FORCE DISTRIBUTION AND SLIP

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 754,071

[22] Filed: Jul. 11, 1985

[30] Foreign Application Priority Data

Jul. 12, 1984 [DE] Fed. Rep. of Germany ....... 3425672

[51] Int. Cl.$^4$ ............................ B60T 8/02; B60T 8/26
[52] U.S. Cl. ...................................... 303/6 R; 60/545; 60/581; 188/349; 188/356; 303/15; 303/114; 303/119
[58] Field of Search .......... 303/6 C, 6 R, 6 A, 61–63, 303/31, 100, 12, 15, 113–119, 4, 7, 8; 188/349, 356, 357, 345; 60/545, 579, 550, 563, 581, 580, 591, 552, 553, 555, 548, 547.1; 251/129.11–129.13

[56] References Cited

U.S. PATENT DOCUMENTS

| | | | |
|---|---|---|---|
| 2,133,580 | 10/1938 | Searle | 188/356 X |
| 2,953,412 | 9/1960 | Hill | 188/357 X |
| 3,038,761 | 6/1962 | Kenrick | 303/6 C |
| 3,232,676 | 2/1966 | Cripe | 303/119 |
| 3,521,934 | 7/1970 | Leiber | 303/114 X |
| 3,690,737 | 9/1972 | Neese et al. | 303/114 |
| 4,071,283 | 1/1978 | Van House | 303/6 R X |
| 4,096,696 | 6/1978 | Van House | 188/357 X |

Primary Examiner—Douglas C. Butler
Attorney, Agent, or Firm—James B. Raden; William J. Michals

[57] ABSTRACT

A brake system for automotive vehicles is equipped with devices for the electric control of the brake force distribution and/or for the control of slip. The front wheels are connected to a pedal-actuated braking-pressure generator (1). In contrast thereto, the rear wheels (HR, HL) are acted upon with braking pressure by virtue of a braking pressure generator unit (5) which is composed of a vacuum servo unit (6) and a master cylinder (7) and which is actuated by a multidirectional control valve (4), such as a three-way/three-position rotary spool valve. The switch position of the valve (4) is responsive to the electric output signals of an electronic combining circuit (17, 17') which is, by way of wheel sensors, furnished with information about the rotational behavior of the wheels and the output of which circuit is electrically connected to the drive (19) of the three-way/three-position rotary spool valve (4). The brake energy for the rear-wheel brakes and the auxiliary energy for boosting the brake pedal force are taken from a vacuum source (Vac).

7 Claims, 4 Drawing Figures

BRAKE SYSTEM FOR THE CONTROL OF BRAKE FORCE DISTRIBUTION AND SLIP

BACKGROUND OF THE INVENTION

This invention relates to a brake system for automotive vehicles comprising devices for the electric control of the brake force distribution onto front and rear axle and/or for the control of slip. The system further comprising an auxiliary energy source and sensors to determine the wheel rotational behavior and the vehicle speed or a corresponding reference value and including electronic circuits for the conditioning, processing and logic combining of the sensor signals and for the generation of electric braking-pressure control signals.

To better adapt the apportioning of brake force onto the front and the rear axle of a vehicle to the respective axle load distribution which is subject to static and dynamic influences and therefore is dependent on the load condition of the vehicle on deceleration and other influences, load-responsive and deceleration-responsive brake force distributors or pressure reducers responsive to braking pressure according to a predetermined characteristic curve are utilized. These auxiliary means are intended to accomplish a uniform contribution of the front and rear axle to braking and to hamper locking of the rear wheels. In the event of overbraking or excessive braking pressure which results, for example, on slippery roads even at a relatively low brake pedal force, the rear wheels are constrained to lock only subsequent to the front wheels, otherwise there would be great risk of skidding, namely due to the loss of the cornering force at the locking wheel. It is a disadvantage that only a relatively rough approximation of the brake force distribution to the actual static and dynamic axle load proportioning can be attained, whereby, in order to avoid the dangerous locking of the rear wheels, the brake systems are dimensioned such that the largest share of brake force is allotted to the front wheels in the majority of situations.

Further, it has been proposed to electronically control the brake force distribution or the brake force share allotted to the rear wheels as a function of the wheel rotational behavior of the front wheels as disclosed in German patent application No. P 33 01 948.7. To this end, braking pressure modulators are inserted into the pressure fluid conduit to the rear-wheel brakes, which modulators close the pressure-fluid passage in the inactive position and which permit electronic control of the flow and hence the brake force share allotted to the rear-wheel brakes in such a manner that there results an approximately ideal brake force distribution onto the front and the rear axle. For this purpose, quick-acting, electromagnetically actuatable multidirectional control valves can be employed, for example, as braking pressure modulators which bring about the desired braking pressure rise at the rear axle by short-direction or pulsed change-over to the open-passage condition.

In another known system, a braking pressure decrease at the rear at the rear wheels (which would become necessary, for example, in the event of reduction of the friction coefficient during braking in order to prevent wheel lock) can be accomplished if additional valves are provided through which, upon an imminent locked condition, pressure fluid can be discharged to a pressure supply reservoir (German patent application No. P 33 06 611.6). This system does not provide that the braking pressure rises again in the rear-wheel brakes upon subsequent rise of the friction value during the same braking action.

It is, therefore, an object of the present invention to develop a brake system which is relatively simple and which is nevertheless reliable in all situations, because a brake force distribution can be attained during every braking action which is adapted to the respective axle load condition, and which brake system admits slip control with repeated pressure decrease and pressure increase at least at the rear axle, and at the front axle after corresponding extension.

SUMMARY OF THE INVENTION

This object is achieved in a simple and technically sophisticated manner by improving upon a brake system of the type referred to such that the brake system comprises a braking pressure generator unit connected to the auxiliary energy source and enabling build up and variation of the braking pressure in the wheel brakes of the rear wheels in response to the electric braking-pressure control signals.

According to a preferred embodiment of the present invention, the braking pressure generator unit is substantially composed of a master cylinder combined with a vacuum actuation system and of an electromagnetically or electromotively adjustable multidirectional control valve which allows control of the pressure difference in the chambers of the vacuum servo unit in response to the braking-pressure control signals. In this arrangement, the servo unit is of a vacuum power brake booster type of construction.

In another embodiment, the servo unit comprises a piston assembly or diaphragm assembly slidably arranged in a cylinder or a housing and subdividing the interior into a vacuum chamber (that is in permanent communication with a vacuum source) and into a working chamber that is temporarily connectible to the vacuum source or to an outside-air inlet for the purpose of controlling the braking pressure with the aid of the multidirectional control valve. For example, a three-way/three-position rotary spool valve is apt as a multidirectional control valve, which valve can be adjusted by means of a step motor or an electromagnetic drive.

According to another embodiment, the brake system in accordance with the present invention consists substantially of a pedal-actuated braking pressure generator connected hydraulically with the front-wheel brakes and of an electrically controllable braking pressure generator unit generating the braking pressure in the rear-wheel brakes. Furthermore, both the pedal-actuated braking pressure generator and the electrically controlled braking pressure generator unit can be provided as a vacuum brake power booster and may consist of a vacuum actuation system combined with a master cylinder. To regulate the wheel slip in the pressure fluid conduits leading to the front-wheel brakes, electromagnetically actuatable multidirectional control valves which are controllable by the output signals of the electronic circuits are provided in a suitable embodiment of the present invention.

Finally, a brake system according to the present invention still affords the possibility of connecting the front-wheel brakes to a braking pressure generator which latter is arranged as a brake power booster and is substantially composed of a vacuum servo unit and a master cylinder unitized therewith. The pressure difference in the working chambers of the servo unit are controllable or variable by means of electromagnetically actuatable multidirectional control valves in such a manner that a brake force boosting will result or a force component opposing the brake pedal force will be caused. The use of proven, very simple and nevertheless extremely reliable servo units, which are devised according to the known principles of power brake boosters, provides a brake system which admits ideal brake force distribution during each braking operation as well as slip control upon an imminent locked condition of a wheel.

BRIEF DESCRIPTION OF THE DRAWING

Further features, advantages and applications of this invention will become apparent from the following description when taken in conjunction with the drawing wherein.

DETAILED DESCRIPTION

Figure 1:
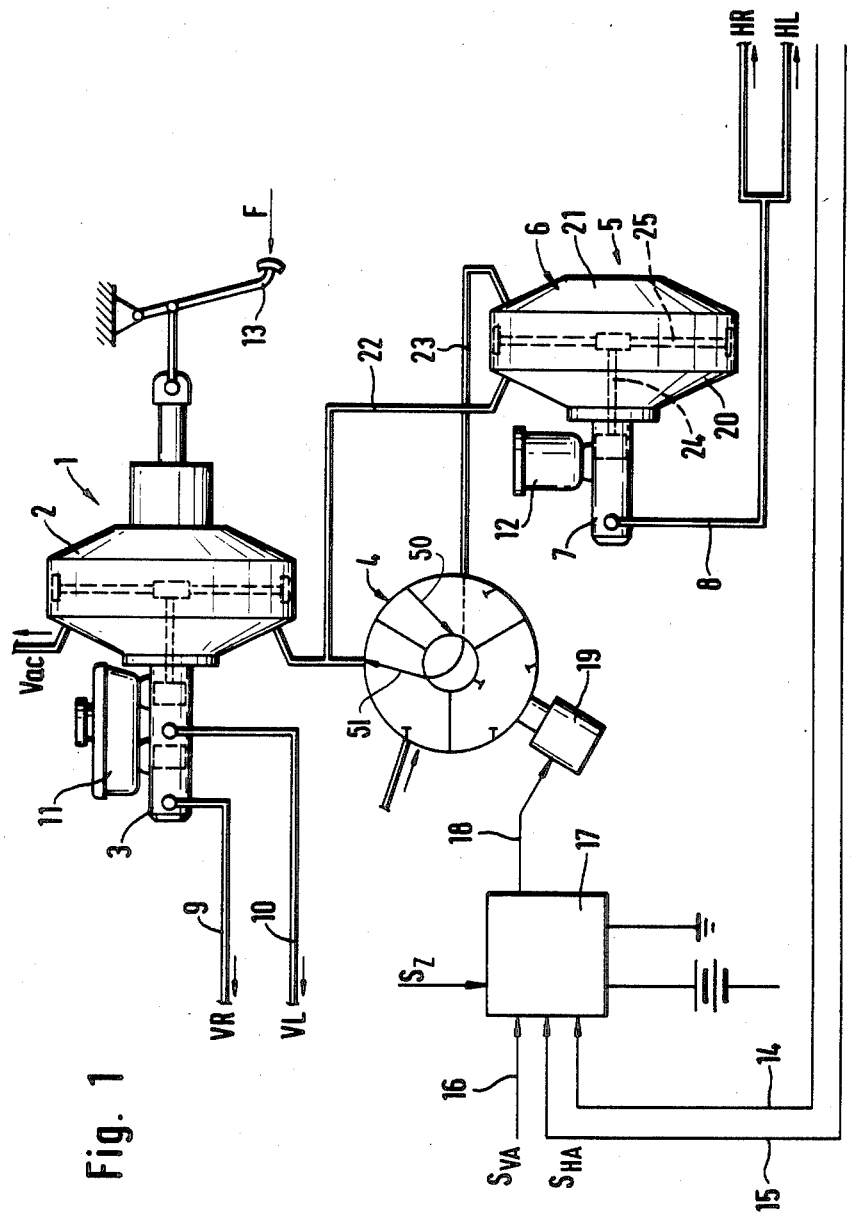
FIG. 1. is a simplified, schematic view of the essential components as well as the hydraulic wiring diagram of a brake system according to the present invention.

FIG. 1 illustrates a brake system of the inventive type with three hydraulically isolated brake circuits. This system is substantially composed of a pedal-actuated braking pressure generator 1, which comprises a vacuum servo unit 2 and a tandem master cylinder 3 structurally united therewith, and which serves to generate the braking pressure in the wheel brakes of the front wheels VR, VL, and which equally comprises a braking-pressure generator unit 5 controlled by way of a multidirectional control valve 4 and serving for the braking pressure generation in the wheel brakes of the rear wheels HR, HL.

The braking pressure generator unit 5 comprises as an essential component likewise a vacuum actuation system or, respectively, a vacuum servo unit 6 which acts upon a master cylinder 7. However, in contrast to the tandem master cylinder 3 of the braking pressure 2, said master cylinder 7 is a single-type master cylinder communicating with which are the wheel brakes of the two rear wheels HR, HL, by way of a joint pressure fluid conduit 8. The wheel brakes of the front wheels VR, VL are connected to the tandem master cylinder 3 by way of hydraulically isolated pressure fluid conduits 9, 10 in the brake system described herein.

FIG. 1 illustrates also pressure-fluid reservoirs 11, 12 pertaining to the master cylinders 3 and 7 and serving for pressure compensation and as pressure-fluid accumulators.

While when the brake pedal 13 is depressed or when a pedal force F is exerted which is symbolized by an arrow, there will be immediate development of a braking pressure in the wheel brakes of the front wheels VR, VL that is proportional to the force F and boosted by the vacuum servo unit 2, the braking pressure at the rear-wheel brakes HR, HL is responsive to electric control signals which allow to adjust the valve 4. To control the braking force distribution or, respectively, the braking pressure at the rear wheels, the inventive brake system arranges for the rotational behavior of the rear wheels and of the front wheels to be determined—individually or jointly for an axle—by means of non-illustrated pick-ups for measuring data. Corresponding electric signals are supplied by way of the signal lines 14, 15, 16 to an electronic circuit or an electronic combining circuit 17 which latter logically combines these signals with one another as well as, if necessary, with other signals representative of the driving behavior of the braking behavior of the vehicle, and which generates control signals which are delivered to the drive 19 of the valve 4 by way of the output of the circuit 17 and by way of a signal line 18. The direction of the signal course is symbolically illustrated by the arrows at the dotted signal lines 14, 15, 16, 18. The signal inputs leading to the wheel sensors are designated by $S_{VA}$ and $S_{HA}$ in FIG. 1, while $S_z$ stands for the inputs for additional sensor signals which are determined e.g. by a translational decelerometer. The circuitry 17 can be realized in a known fashion by hard-wired or by programmed circuits.

In the embodiment of the invention described, the auxiliary energy for boosting the pedal force F and for generating a braking pressure in the rear-wheel brakes HR, HL is taken from a vacuum source, to which a port 'Vac' is leading. The interior of the servo units 2, 6 accommodates pistons or diaphragms which subdivide the interiors into two chambers and, in the presence of a pressure difference in said two chambers, transmit a corresponding force onto the pistons in the connected master cylinders 3, 7.

The pressure difference between the two chambers 20, 21 in the inside of the vacuum servo unit 6 will be controlled by way of the valve 4 which is herein designed as a three-way/three-position rotary spool valve. The vacuum chamber 20 on the side the master cylinder 7 is attached is permanently connected to the vacuum source 'Vac', while the working chamber 21 is connected to, or completely shut off from, the outside air, i.e. the port 'Air', or the vacuum source, i.e. the port 'Vac', by way of the port 23 or by way of the valve 4, i.e. by way of passages 50 and 51, respectively, of specific cross-section in the inside of the valve 4. By way of the piston rod 24, a force which corresponds to the difference of pressure between the chambers 20, 21 is transmitted from the diaphragm 25 onto the piston inside the master cylinder 7 and from the latter onto the wheel brakes of the rear wheels HR, HL.

The rotary spool valve 4 permits to be unitized with the braking pressure generator unit 5. In the embodiment according to FIG. 2, the rotary spool valve 4 is integrated on the front side of the vacuum servo unit 6 into the housing 43 of said unit. The valve 4 herein consists of a stationary control disck 26 and a movable control disc 27, which, depending on the angular position, either connects the working chamber 21 by way of openings 28 with the vacuum port 'Vac' or with the outside air by way of the port 'Air', or which interrupts the connection to the outside. The opening cross-section 28 is dependent on the angular position of the movable control disc 27 in relation to the stationary control disc 26, and it is variable.

Figure 2:
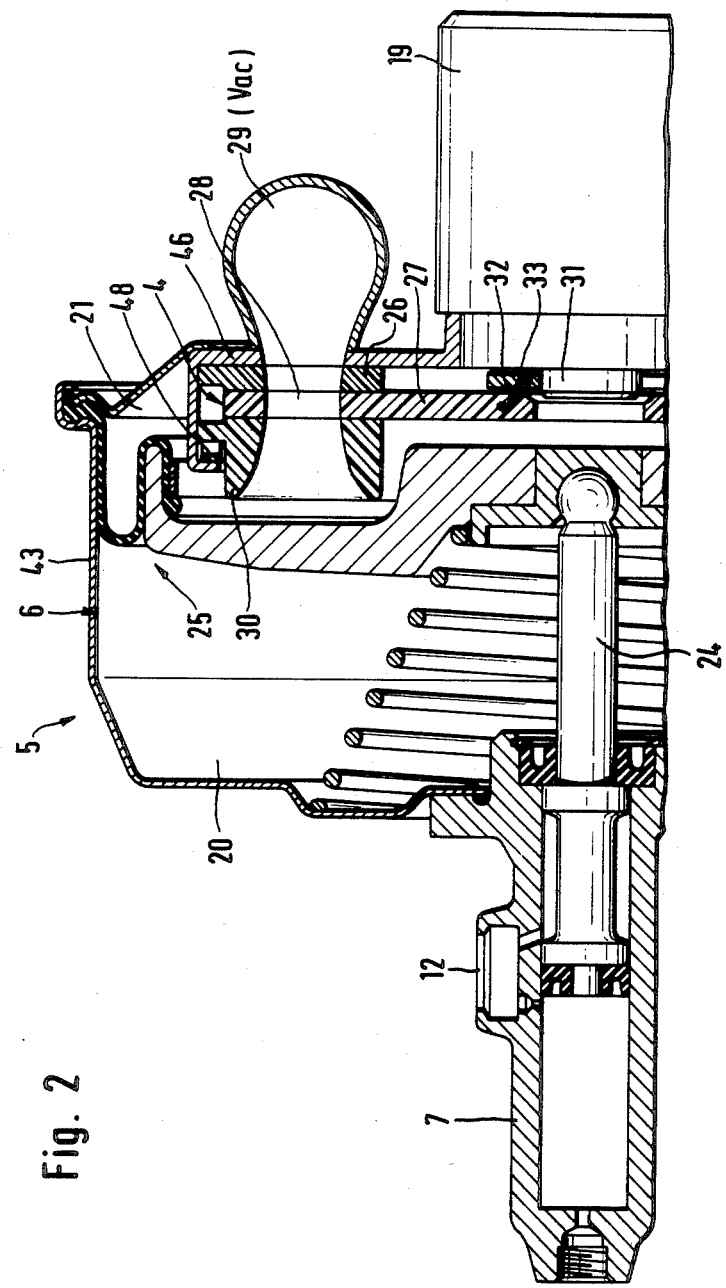
FIG. 2. is a sectional and partial view, on an enlarged scale, of an embodiment of the braking pressure generator unit including the associated multidirectional control valve of the brake system of FIG. 1.

FIG. 2 discloses an outside port 29 which leads to the vacuum source 'Vac', for instance. The port 'Air' is also placed on the front side of the unit 6, compare FIG. 3, however, it is displaced by a predetermined angle $\theta_{2'}$ so that a connection between the chamber 21 by way of a specific opening cross-section 28 with the outside air will be established only after the control disc 27 has been turned.

The control discs 26, 27 of the valve 4 as well as the valve 33 influencing the flow are suitably made of plastics. The entire valve assembly is herein pressed against a housing part 46 on the front side of the unit 6 by a wave-shaped spring 48. As a drive for turning the control disc 27 an electric step motor 19 is provided carrying on its drive shaft 31 a clutch ring 32 that is coupled to the movable control disc 27 by an elastic element 33. Said electric motor 19 and the rotary spool valve 4 are combined by the housing part 46 to form a unit.

Figure 3:
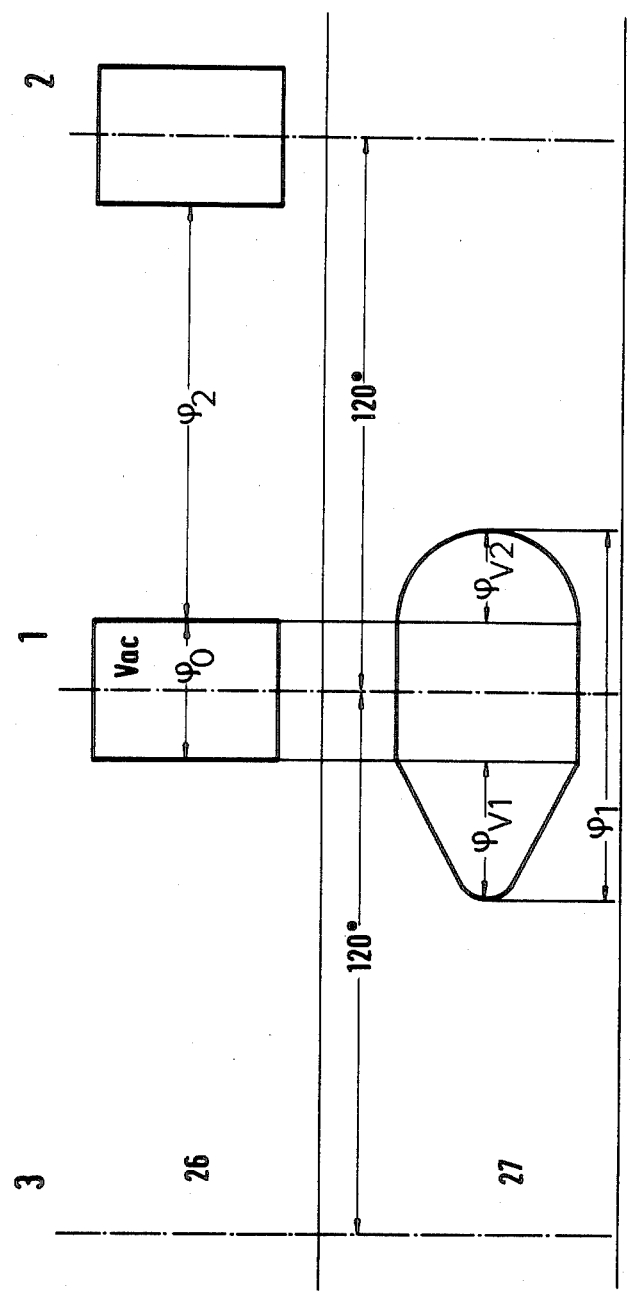
FIG. 3. is the control diagram of the multidirectional control valve according to FIGS. 1 and 2; and, FIG. 4. is, in view similar to that of FIG. 1, the principal design of a brake system according to another embodiment of this invention.

FIG. 3 discribes the control chart of the rotary spool valve according to FIGS. 1 and 2. It comprises three positions offset by 120°. The initial position is in any case the position 1 that is illustrated in FIG. 2, in which the working chamber 21 is connected to the vacuum port 29 (Vac). In this position, the master cylinder 7 is in its release position. When the brake is applied, the control disc 27 moves from the position 1 to the position 2. After the desired braking pressure has been reached in the connected rear-wheel brakes HR, HL, the control disc will be turned further by switching the step motor 19 to assume the position 3. When the brake pedal 13 is released, compare FIG. 1, the control disc 27 moves back to the position 1. A major advantage of the rotary spool valve 4 used in the embodiment described herein consists in that, in accordance with the electric control signals which are supplied by way of the signal line 18 to the step motor 19, the valve permits to be switched from any position directly to any other.

The described process of the control disc movement, i.e. from position 1 to position 2 to position 3 to position 1, corresponds to a normal braking action. If pulsating increase and decrease of the braking pressure at the rear axle is desired, this can be realized by partial movements, i.e. from position 3 to position 1 to position 2, or from position 3 to position 2 to position 3.

As another particularity for this control method, so-called initial control angles $\theta_{V1}$, $\theta_{V2}$ are provided. The sequence of the regulating and control processes suggests to devise the cross-section defining time in the direction from position 1 to position 2 in a way different from that in the direction from position 1 to position 3. Therefore, in the first case of FIG. 3, the time cross-section was devised larger than in the opposite direction, because on the one hand the valve is required to rapidly reach its full extent of opening upon quick braking pressure increase or decrease; in FIG. 3, this corresponds to a movement of the control disc 27 to the right. If, however, finely dosed pressure corrections are required, in order to slightly reduce a too high braking pressure for instance, what is performed by turning the cam out of position 3, then a considerably smaller increase of the opening cross-section 28 is arranged for in the area of the control angle $\theta_{V1}$ than in the area $\theta_{V2}$, compare FIG. 2. To prevent the occurrence of a hydraulic short circuit between the positions 1 and 2, $\theta_2$ must always be greater than $\theta_1$.

The proportioning of the brake force due to the inventive use of individual braking pressure generators for the front wheels and for the rear wheels enables utilization of the pedal transmission and the working capacity of the vacuum braking pressure generator 2 and of the associated master cylinder 3 solely for the front axle. The device which acts on the rear axle and which is actuated by the braking pressure generator unit 5, to which the single-type master cylinder 7 is belonging, is a mere auxiliary-force brake. Therefore, said unit 5 is to be adapted in respect of the actuating work of the rear axle alone. Owing to this proportioning, the units may be of compact design. Besides, it is possible to optimally conform to the respective requirements.

Figure 4:
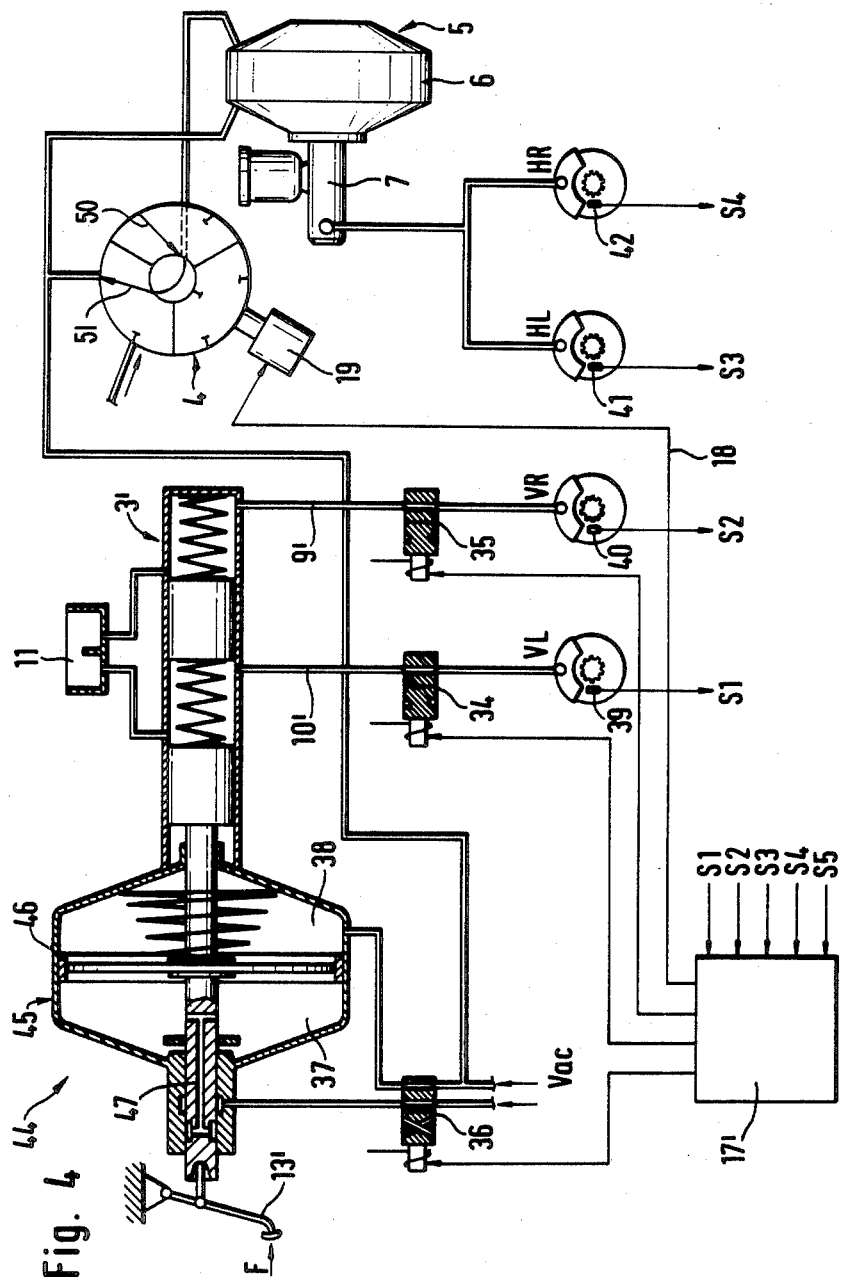

In the embodiment of this invention illustrated in FIG. 4, additional multidirectional control valves 34, 35 and 36 are inserted into the pressure fluid conduits 9'. 10' leading to the front-wheel brakes VR, VL as well as into the connection of a braking pressure generator 44 or the servo unit 45 of this braking pressure generator, respectively, which valves are likewise controllable by way of output signals of the electronic circuit 17'. In all other respects, the braking pressure system according to FIG. 4 is identical with the system of FIG. 1., for what reason—to avoid repetitions—we refer to the explanations given with regard to FIGS. 1 to 3.

Because of the additional valves 34 to 36, the braking pressure at the individual front wheels can be kept constant, decreased and re-increased in the event of an imminent locked condition and for slip control. In order to keep the pressure constant, it is sufficient to temporarily change the two-way/two-position directional control valves 34, 35 over to assume their closed position, the said valves being switched to open passage in their initial position. When a pressure decrease becomes necessary at a front wheel brake VL or VR, changing over of the four-way/two-position directional control valve 36 causes temporary exchange of the ports of the chamber 37, 38 of the vacuum servo unit 45 so that now the pressure in the chamber 38 close to the master cylinder rises compared to the pressure in the chamber 37, so that a force component opposing the brake pedal force F is generated and is transmitted by way of the diaphragm 46 as well as by way of the push rod 46 onto the brake pedal 13'. Pressure relief propagates by way of the master cylinder 3' and the two-way/two-position directional control valves 34, 35 up to the wheel brake of the connected front wheel. The pressure decrease can be limited to one front wheel by temporarily closing one of the two valves 34 or 35, while the braking pressure remains constant in the wheel of the closed valve.

To control the brake slip at the rear wheels, the embodiment according to FIG. 4 equally employs the rotary spool valve 4, as has been described already by way of FIGS. 1 to 3.

To determine the rotational behavior of the wheels, each wheel is furnished with an inductive pickup fr measuring data 39 to 42 which, by way of the ports $S_1$ to $S_4$ delivers information about the rotational speed and the variations thereof to the circuit 17'. In turn, a translational decelerometer, for instance, may be connected to the input $S_5$.

What is claimed is:

1. A brake system for automotive vehicles having front and rear wheels and front and rear wheel brakes, comprising: a pedal-actuated braking pressure generator unit for generating braking pressure in the wheel brakes of the front wheels; an electrically-controlled braking pressure generator unit for varying the braking pressure in the wheel brakes of the rear wheels, said unit having a vacuum chamber and a working chamber with a closeable outside-air inlet; a vacuum source attached to said vacuum chamber; sensors associated with said wheels to determine the vehicle speed and the wheel rotational behavior and to generate signals indicating this information; electronic circuits for receiving and logically processing said signals, and for generating control signals; and a three-way/three-position rotary spool valve for receiving said control signals, said valve having a stationary control disc and a movable control disc with an opening therein permitting communication between either of said vacuum source or outside air through said inlet and the working chamber of said electrically-controlled braking pressure generator unit, whereby said valve varies the pressure difference between said vacuum and working chambers depending upon the angular position of said two discs relative to each other and to the opening cross-section and whereby the braking pressure on the wheels can be adjusted in response to said control signals from any of the three valve positions directly to any other valve position.

2. A brake system as claimed in claim 1, wherein the electrically-controlled braking pressure generator unit comprises a master cylinder and a vacuum servo unit, said vacuum servo unit having a housing and a piston and diaphragm assembly slidably arranged in said housing and subdividing the interior into said vacuum chamber and into said working chamber.

3. A brake system as claimed in claim 2, wherein said three-way/three-position rotary spool valve is adjustable by means of electromagnetic drive.

4. A brake system as claimed in claim 1, wherein said three-way/three-position rotary spool valve is adjustable by means of a step motor.

5. A brake system as claimed in claim 1, wherein both the pedal-actuated braking-pressure generator unit and the electrically controlled braking-pressure generator unit are arranged as vacuum brake power boosters and each substantially consist of a vacuum actuation system and a master cylinder.

6. A brake system as claimed in claim 5, wherein an electromagnetically actuatable multidirectional control valve is inserted in fluid communication with each of said front-wheel brakes to control the wheel slip, which valves are controllable by virtue of the control signals of the electronic circuits.

7. A brake system as claimed in claim 6, wherein said pedal-actuated braking pressure generator unit includes a vacuum chamber and a working chamber with an outside-air inlet, and wherein said brake system also includes another electromagnetically actuatable multi-directional control valve responsive to said control signals and in communication with said vacuum source, said vacuum chamber, and said outside-air inlet of said pedal actuated braking pressure generator unit, whereby said valve can cause an auxiliary force to either assist or oppose the pedal force applied to the pedal-actuated braking pressure generator unit by regulating the pressure difference in the chambers of said pedal-actuated braking pressure generator unit.

* * * * *